July 7, 1931.  A. PONCET  1,813,762
MACHINE FOR TUBULAR WEAVING
Filed July 7, 1927  8 Sheets-Sheet 1

July 7, 1931. A. PONCET 1,813,762

MACHINE FOR TUBULAR WEAVING

Filed July 7, 1927 8 Sheets-Sheet 7

Fig. 8.

INVENTOR
Alexandre Poncet
BY
Emil Bönnelycke
ATTORNEY

July 7, 1931.  A. PONCET  1,813,762
MACHINE FOR TUBULAR WEAVING
Filed July 7, 1927    8 Sheets-Sheet 8

INVENTOR
Alexandre Poncet
BY
Emil Bonnelycke
ATTORNEY

Patented July 7, 1931

1,813,762

UNITED STATES PATENT OFFICE

ALEXANDRE PONCET, OF PARIS, FRANCE

MACHINE FOR TUBULAR WEAVING

Application filed July 7, 1927, Serial No. 204,057, and in France August 20, 1926.

This invention relates to machines for weaving tubular fabrics such as hose for transporting fluids, sheaths for electric cables and the like.

The objects of the invention are (1) to provide a tubular weaving machine of simpler and less expensive construction than those heretofore used; (2) to provide a tubular weaving machine of greater productive capacity by reason of a construction permitting the effective use of more shuttles, larger weft-thread bobbins and the operation of the machine at higher speeds than have been practicable before this time; (3) to provide a co-ordinated mechanism for guiding and manipulating the warp-threads which form the shed, for maintaining a tension on the warp-threads and for driving the weft-thread shuttles in a circular path through the shed; (4) to improve the construction of a tubular weaving machine by making parts of similar function interchangeable and by making the moving parts easily accessible for oiling and for repair or replacement.

Broadly, my machine is characterized by the fact that the shuttles carrying the weft thread are driven through the shed by a number of pivotally mounted, oscillating levers which feed and manipulate the warp threads to open and close the shed, and which also provide a track on which the shuttles slide. The weft threads are wound spirally by the circular movement of the shuttles on the track thus provided.

The levers are in pairs, the one lever of a pair moving in a direction opposite to that of the other so that the two threads which they carry and which form the unit part of the shed are oscillated past each other thus opening the shed first with one thread above and then with the other. As each pair of levers acts on a shuttle to drive it, it closes the shed formed by its warp threads over the weft thread of that shuttle and then opens the shed, with the warp threads in opposite relation, to receive the next weft thread. The levers also operate devices which keep a tension upon the warp threads during their manipulation by compensating for the slack which is incident to the oscillation of the levers.

Another characteristic feature is the provision of a number of removable, interchangeable operating units, each of which comprises a pair of levers for feeding two warp threads, thus forming a unit shed, and a unit mechanism for causing the oscillation of these levers past each other to drive the shuttles and to open and close the shed in proper relation to the shuttle movement. With each unit is a take-up mechanism for the two threads which each unit cares for. A common cam operates all of these pairs or units in a predetermined relation such that all of the shuttles are propelled uniformly about the machine.

In order to make my invention more clearly understood, I have illustrated embodiments thereof in and by drawings appended hereto and wherein.

The machine is supported on legs 1 on which is secured the main frame 2. In the central bore of said frame is set a hollow shaft 4 which constitutes a spindle for a rotary cam plate 6. This cam plate has gear teeth 8 along its circumference and, on its upper surface, has a cam groove 10. The groove engages a circular series of rollers 9 each of which rotates on a spindle 9a secured to the lower end or arm of a three-armed lever 11. Each three-armed lever is mounted on a spindle 48 secured on the inwardly extending wing of a fixed support 19 which is bolted to the main frame 2. On the ends of the horizontal arms of each three-armed lever are mounted pivotally, as at 49 in Figure 8, the two connecting rods 12 which are secured respectively by pins 50 to the two shuttle driving levers which form an operating pair. Each pair of levers, indicated at 13 and 13a, is mounted on a common spindle 51 secured on the fixed support 19. The levers of each pair are adapted to rock to either side of a horizontal line through the pivot 51 like the blades of a pair of scissors.

The cam plate 5 is rotated by a pinion 6 which meshes with the peripheral teeth 8. The gear 6 is fast on a vertical spindle 7, supported in a bearing 3 in the machine frame 2 and, at its upper end, in a bearing 34 in the upper frame member 31 which is supported from the machine frame 2 by the posts 33. A bevel gear 26 keyed on the spindle 7 is engaged by a bevel gear 27 on a horizontal drive shaft which carries the driving pulleys 28 and 29 and is supported from the machine frame by bearing hangers 30. Thus, when the pulleys are driven, the cam plate 5 is rotated and presents the various portions of the cam groove 10 (described hereinafter) successively to each roller 9.

Figures 1, 3:
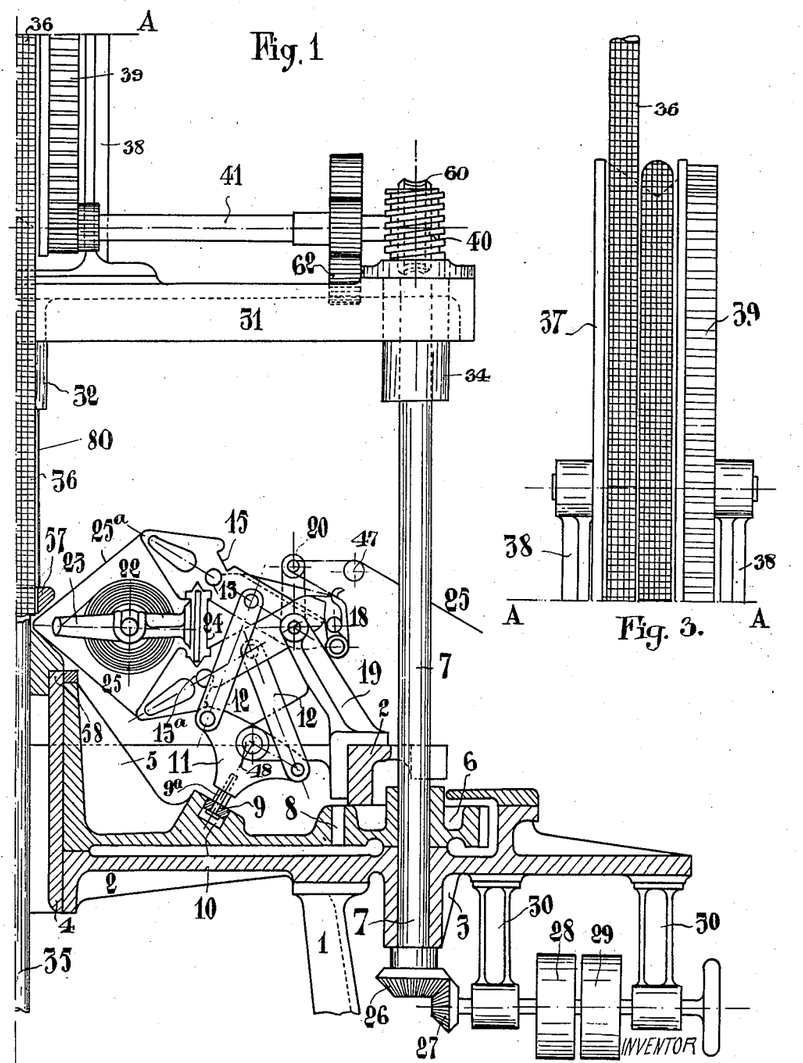
Figure 1 is a central vertical sectional view through one half of a circular machine embodying the present invention.
Figure 3 is a view, in elevation, of the portion of the same machine above the line A—A of Figures 1 and 2, this portion being shown separately because of the limitations of the sheet.
Figure 2:
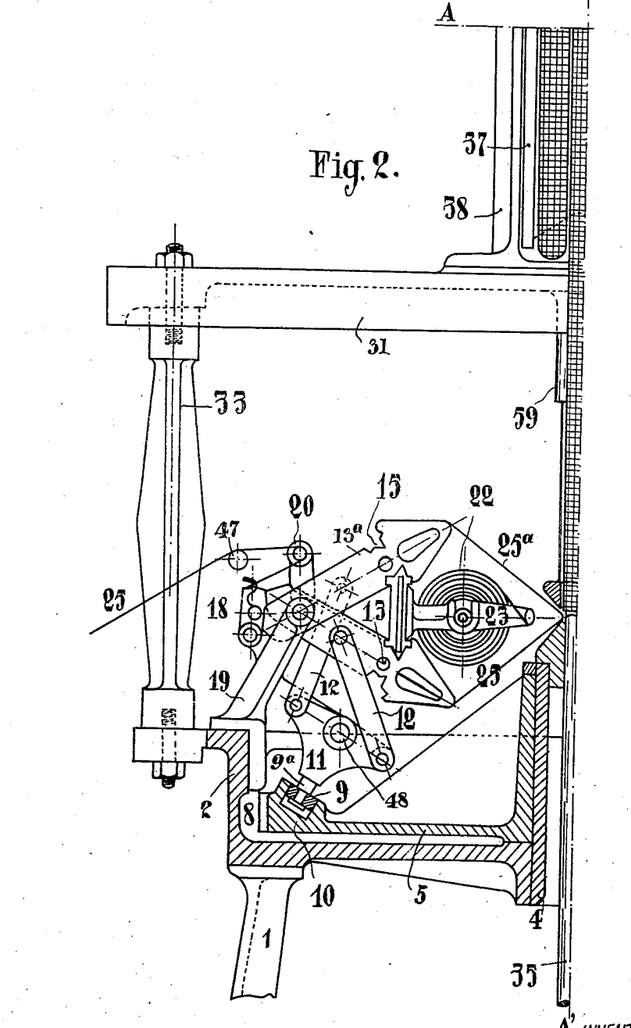
Figure 2 is a similar view through the other half of the same machine with the operating parts in the position they occupy when the corresponding parts of the one half are as shown in Figure 1.
Figures 4, 5:
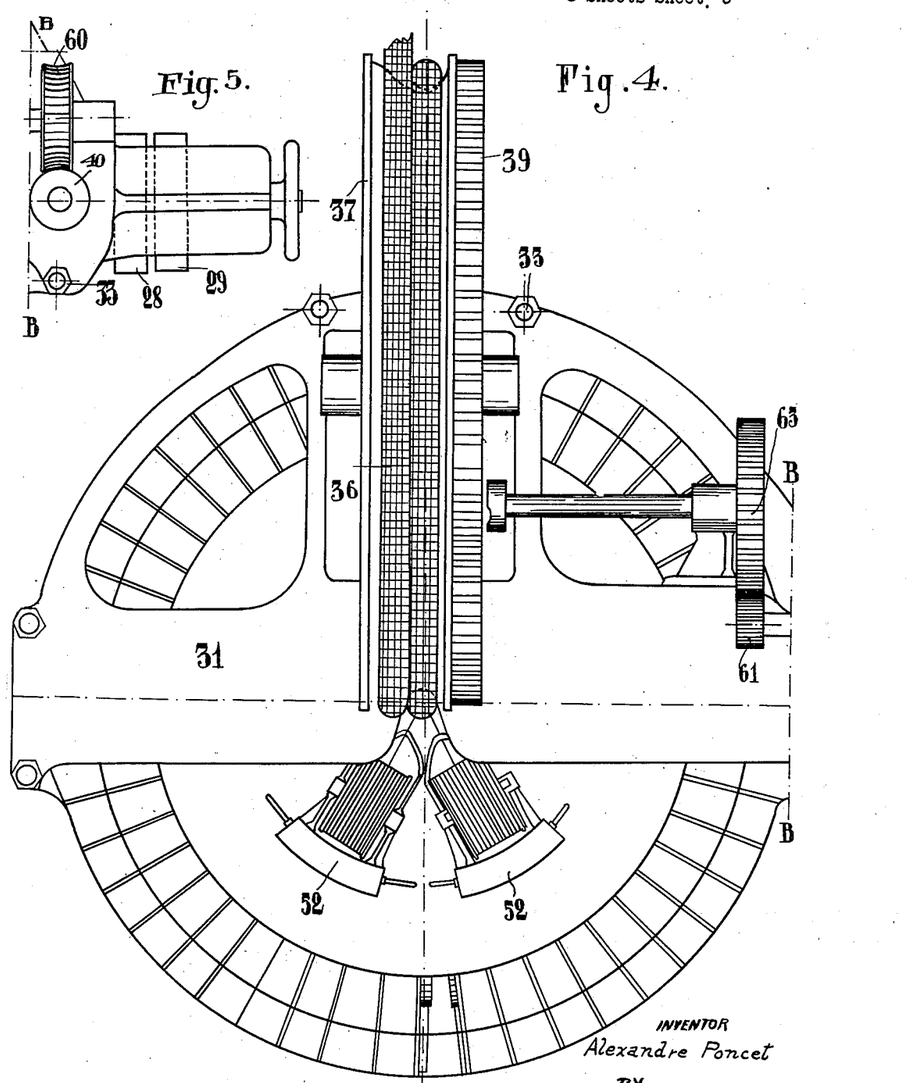
Figure 4 is a top plan view of the same machine with the shuttle-operating mechanism and some of the shuttles removed.
Figure 5 is a top plan view of the portion of the same machine to the right of the line B—B in Figure 4.
Figure 6:
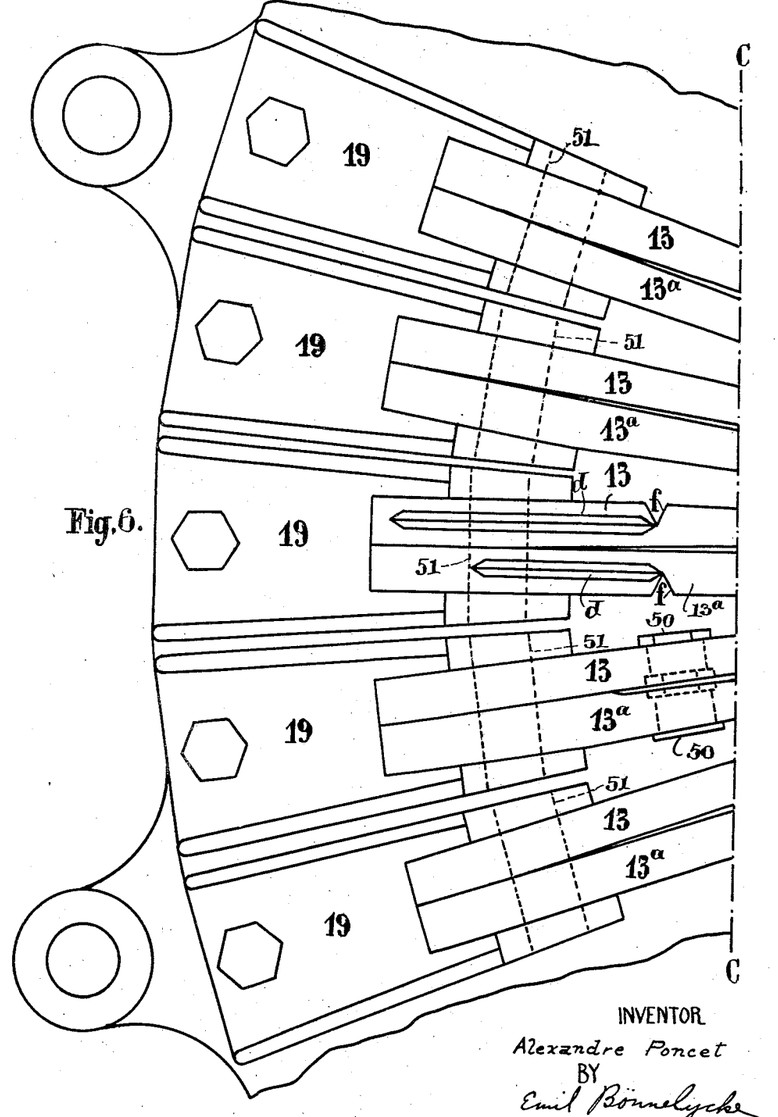
Figure 6 is a top plan view of the outer portion of a sector of the same machine showing the mounting of the pairs of levers on the machine frame.
Figure 7:
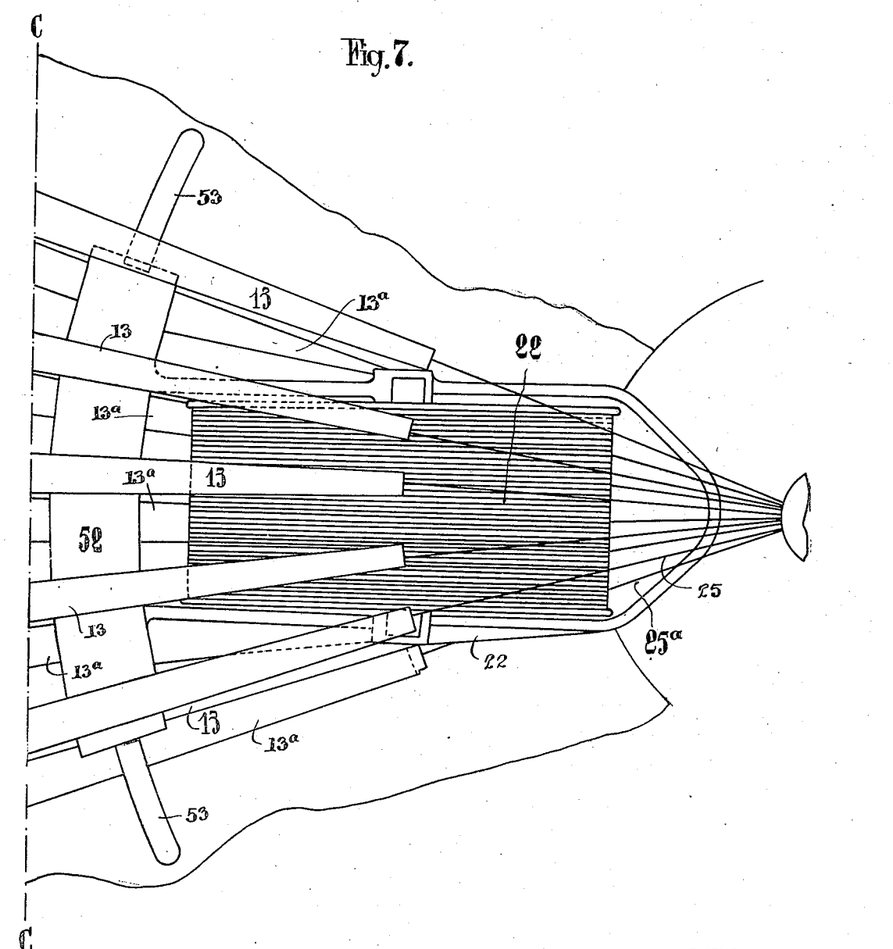
Figure 7 is a similar view of the inner complementary portion of the same sector within the line C—C of Figure 6 and it shows also the relation of the levers to a weft-thread shuttle.

The groove 10 imparts to each lever 11 a rocking motion bringing the levers progressively to the two extreme positions shown respectively on Figures 1 and 2 and, through the connecting rods 12, it compels the shuttle-driving levers 13 and 13a associated with each three-armed lever 11 to rock so as alternately to occupy the down and up positions indicated on Figures 1, 2 and 8 and 9.

Figure 9:
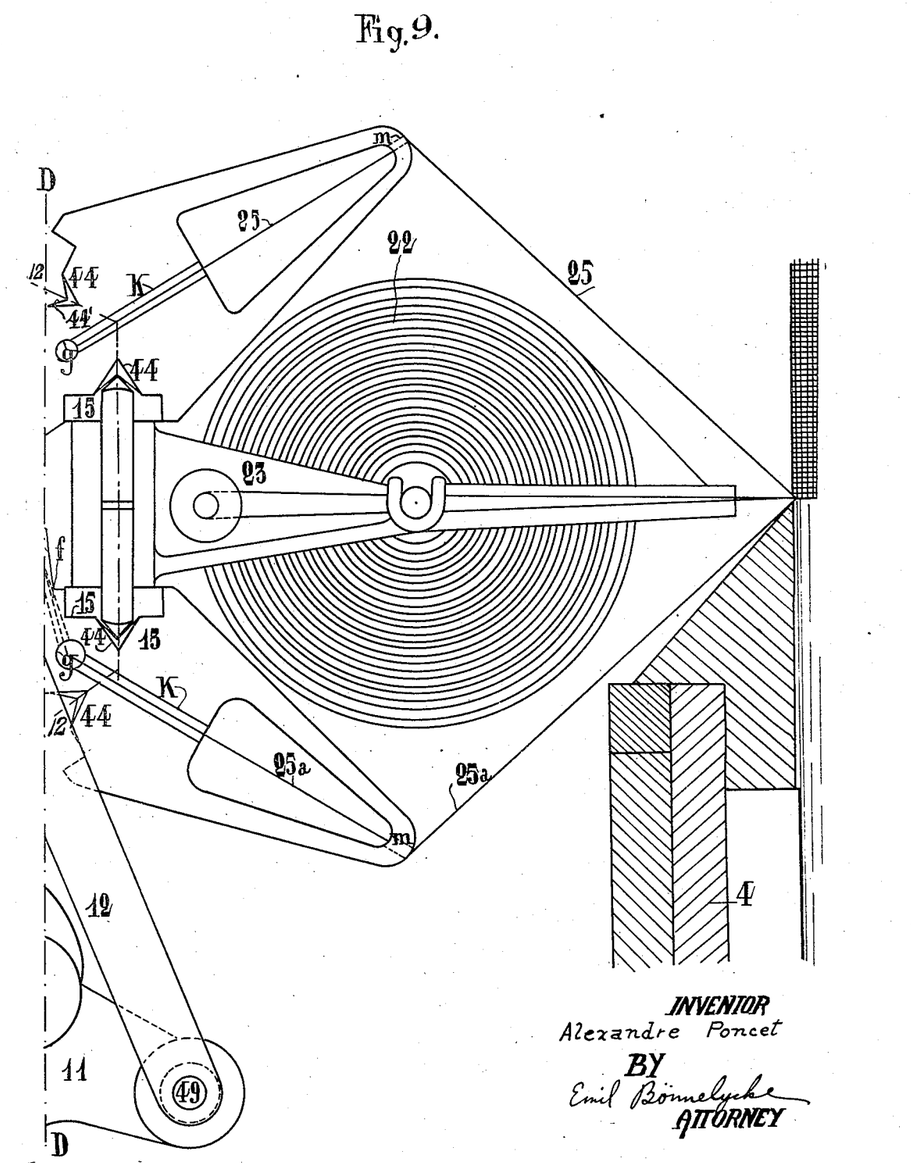
Figure 9 is a similar view of the complementary portion of the same pair of levers radially within the line D—D of Figure 8.

The shuttle-driving levers 13 and 13a have on their under and upper faces grooves 15 which form a path or course along which the shuttle-plate 52 is adapted to travel. Each groove 15, as shown best in Figure 9, is at an angle to the axis of the lever and has a central, V-shaped recess 44 in its bottom. The upper and lower faces of the arms 13, 13a are tapered (Fig. 12) to provide knife edges on their adjacent sides. The recesses 44 extend into the thicker portions and therefore provide surfaces (Fig. 9) instead of edges alone but these surfaces are inclined so that a knife-edge $44^1$ is, in fact, presented to the shuttle-plate ends 53 (see Fig. 12).

The shuttle-plate ends (Figures 12 and 13) are constituted by members 53 cut to a point or nose and pivotally mounted at 56 on a block which is itself pivotally mounted in the plate 52 on two spindles 55. In this manner, the shuttle-plate ends are adapted freely and slightly to play in two different planes which are, if reference is made to Figure 12, the plane of this figure and the plane perpendicular thereto. The purpose of this arrangement will be hereinafter explained.

Figure 8:
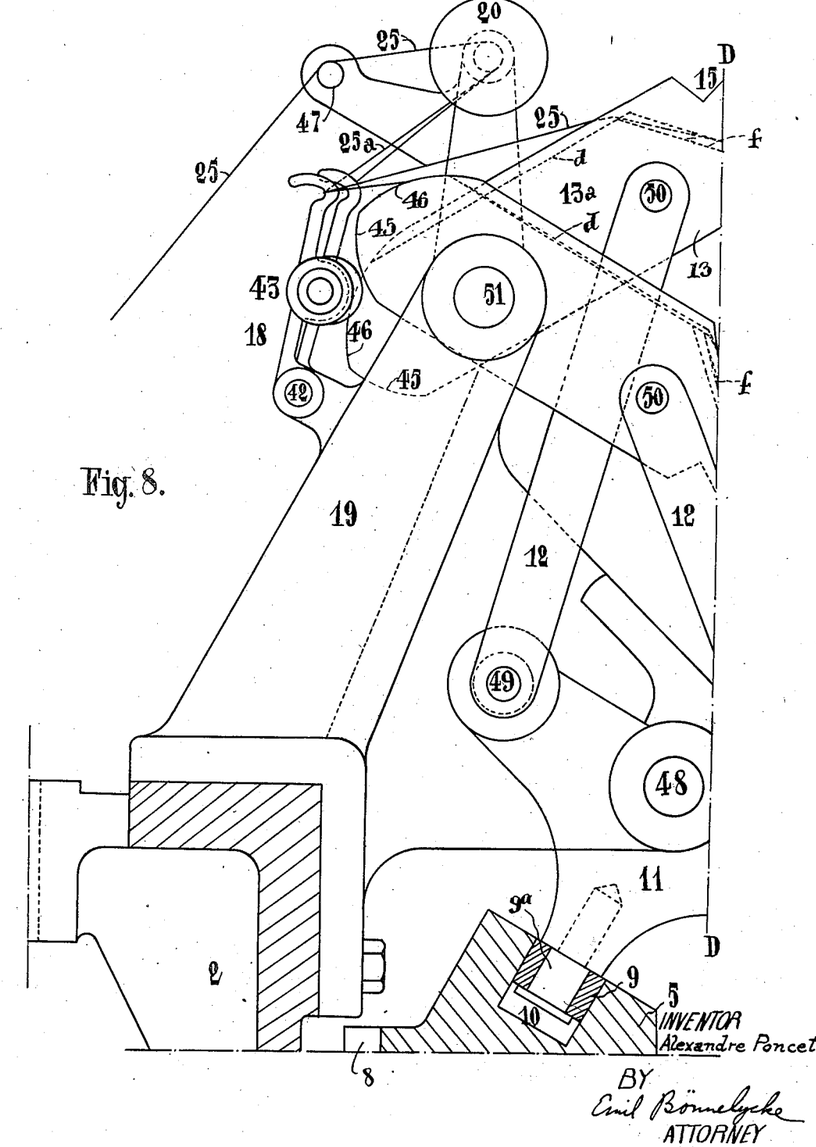
Figure 8 is a view, in elevation, of the outer portion of a pair of levers and associated mechanism for oscillating them when said mechanism is operated by the rotary cam.

As shown on the appended drawings, the machine is equipped with six shuttles and the cam, which is represented on Figure 8, comprises a groove formed of six arcs of circle joined by straight channels.

More or fewer than six shuttles may be used and, if a different number are used, the cam groove 10 must be modified accordingly so that each pair of levers will cause the opening of a shed for each shuttle and will close to give the shuttle an impulse forward and to close the warp threads over its weft-thread.

Each shuttle 24 consists of a bobbin 22 mounted horizontally in grooves in a stirrup-shaped frame 23 and the shuttle-plate 52 secured to or integral with the stirrup-shaped member. Large bobbins, requiring less frequent stops for changes, may be used due to the good clearance between the warp threads carried by the pairs of rocking levers 13, 13a.

The walls of the groove made in the cam must offer the same inclination to the vertical as does the spindle 9a when the latter is in its two extreme positions, as indicated on Figure 1.

The grooves made according to the inner arcs of circle are inclined in the direction opposite to that of the grooves made according to the outer arcs of circle. The portion of a groove which joins an outer arc to an inner arc offers a variable inclination, and must have vertical sides along its middle part.

Figure 10:
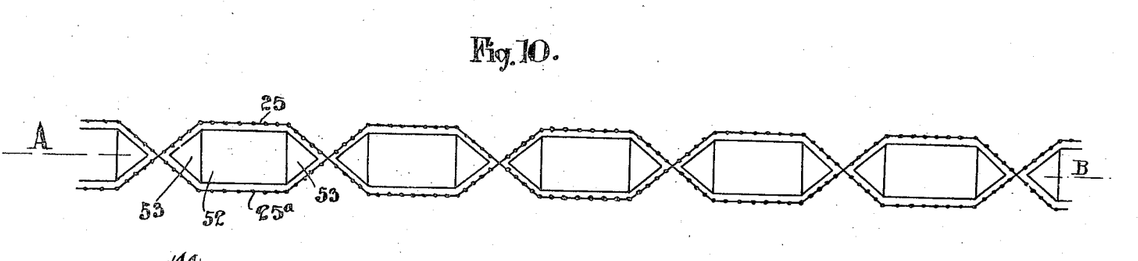
Figure 10 is a schematic, developed view showing the relation of the warp threads to the several weft thread shuttles at any instant.
Figure 11:
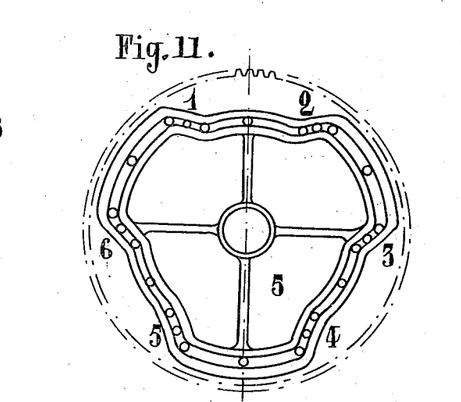
Figure 11 is a plan view of the cam which operates the pairs of levers, a number of the cam-followers being indicated by circles.

So, when a roller 9 is engaged by a circular portion of the cam, the shuttle-driving levers 13 and 13ª are in their extreme positions, as indicated by Figure 1, and their grooves 15 constitute a slide path for the shuttle-plate. When a roller 9 engages a straight portion of the cam, levers 13 and 13ª, pivoting their spindle 51 assume various intermediate positions, as is diagrammatically shown by Figure 10.

In the course of their movements, levers 13 and 13ª press upon the inclined edge of the shuttle plate nose and compel the shuttle to move forward.

The importance of using a slightly mobile shuttle nose, as hereinabove explained, will now be apparent. In order that the shuttle may slide without any friction or jamming, a necessary condition is that levers 13 and 13ª will come precisely at the same instant into driving engagement with the shuttle nose. The driving, of course, comes about from the engagement of the levers with the rear wedge-shaped end or nose of the shuttle.

Were no special arrangement provided, this condition would require perfect adjustment of the parts, a very expensive operation.

On the contrary, with a shuttle nose freely mounted on the plate so as to be adapted slightly to shift with respect to the shuttle plate, said nose self-sets properly and slides without jamming along the grooves 44. Said grooves are bevel cut and sloping as can be seen on Figures 9 and 12, so that contact of levers 13 and 13ª will always take place according to a substantially vertical line, another condition to ensure that the shuttle will slide without jamming. These grooves 44 are formed as V-notches in the edges of the arms 13, 13a and the edges are beveled away on both sides of the ridge 44' of each notch.

It should be noted that, during the motion of levers 13 and 13ª their positions are not always symmetrical with respect to the horizontal except, however, when in their extreme positions.

Figure 12:
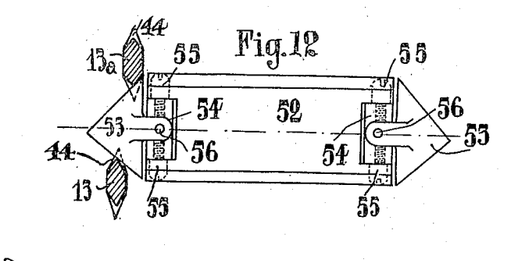
Figure 12 is a view, in elevation, of the portion of a weft-thread shuttle which is engaged by the pairs of levers and it shows also one pair of levers, in section on the line 12—12 of Fig. 9, in driving relation to the shuttle plate.
Figure 13:
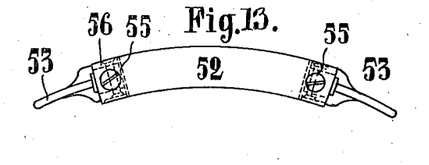
Figure 13 is a top plan view of the same portion of the shuttle plate.

The down coming lever works at a greater speed than the upcoming one, during the first part of the travel, whence the dissymmetrical shape that must be given to the shuttle nose, by having the apex or peak of each nose slightly off-set below the center line of the plate as shown in Figure 12.

Besides their shuttle driving duty, levers 13 and 13ª fulfil the further duty of carrying the warp threads 25 and 25ª, which always are very numerous. Said threads, which are wound on bobbins of trade type carried on suitable supports outside the machine, are grouped underneath the machine and thence are passed over the spindles 47 which are secured on bosses integral with the support 19 (Figure 8). They next are run between friction disks 20, analogous to those of sewing machines, and then are caught by hooks forming the ends of levers 18 that pivot on spindles 42 secured on other bosses integral with the support 19.

Said levers 18 carry rollers 43 adapted freely to revolve on their spindles, and to come into contact with the suitably shaped ends of levers 13 and 13ª.

Said threads run through grooves $d$ provided on the top side of levers 13 and 13ª, next through holes $f$—$g$ then through grooves $k$, and lastly, coming out through holes $m$, are woven on the cable to be covered or on a chuck positioned in the center of the machine as will be hereinafter explained.

When levers 13 and 13ª begin to close, threads 25 and 25ª tend to slacken, but since the ends of levers 13 and 13ª are cam-shaped, said ends push levers 18 so that ultimately, the tension of threads 25 and 25ª remains constant during the lever operation.

The shape of the ends necessary to accomplish this movement of the levers 18 is readily found as a matter of ordinary engineering skill, once given the inventive idea of utilizing the levers in this way to maintain uniform yarn tension.

It should be pointed out that thread slackening is not the same according as the lever is above or below horizontal position. In order to allow for this fact, cam portions 45 and 46 are made of slightly different section in such a way that the warp thread will constantly be under one and the same tension, a requisite for proper weaving.

As concerns the constitution of the machine, it may be noted that all duties appertaining to formation of the fabric, to wit: shuttle drive, opening and closing of the angle of warp threads, maintenance of constant thread tension, are effectuated by the movements of the pairs of levers 13 and 13ª and that all the parts cooperating in those duties are carried by support 19. Constructionally, each pair constitutes a unit, while the machine is constituted by a number of such units, all alike and adapted to be bolted on the main frame. This feature permits standardized construction, advantageous as regards cost price. Furthermore, and with the same units, machines of various capacities can be built according to the user's demand. Lastly, in the event of a part getting damaged, everything can be promptly put in working order again by substituting a new unit for the unserviceable one.

All the parts of the machine are easily accessible and well in view. Cam 5, which is an essential element can very readily be inspected and lubricated, proper lubrication being a prime requisite for good operation with this machine on account of the considerable number of rollers which frictionally run in a cam groove.

My machine can, in the first place, be used for covering with woven fabric things such as electric cables, rubber pipes, hose and the like.

For this work, as shown by Figure 1, the article to be covered is run through the hole in spindle 4, and once the fabric is woven, the product 35 is wound on a drum 37 mounted in supports 38 which draws it in a continuous manner and from which it is wound on bobbins or reels positioned outside the machine.

The drum 37 has an annular gear 39 on one face and is driven thereby from the driving spindle 7. The intermediate gearing consists of a worm 40 on the spindle 7 and meshing with a wheel 60 which drives a horizontal shaft carrying a pinion 61. The pinion 61 drives a pinion 63 through an idler gear 62 and, thus, drives shaft 41 which carries pinion 63 and the gear 64 which engages the annular gear 39 on the drum 37.

With the above described machine a coreless tubular fabric can also be made. For this purpose, a small chuck is secured in the center of the machine and the fabric is woven thereon. The tubular fabric so formed slips on the chuck and goes to be wound on drum 37 or else is caught between two slightly corrugated disks revolving in opposite directions and applied against one another by springs. Cones 57 and 58 are purposed to keep the weaving point in one and the same position and also to center the article to be covered.

Cone 57 is carried by a support 60 adapted to slide in plate 31 of the machine so as to be adjustable heightwise.

An important feature of the machine which is the object of my invention is the fact that levers 13 and 13ᵃ are pivotally mounted on a common spindle 51. This permits the shuttle plate to be given a comparatively small height and the amplitude of motions caused by the cam to be reduced. In this manner frictions and inertia that hinder high speeds are minimized.

I wish it to be clearly understood that the above described embodiment is in no way intended as limitative and that I reserve the right to introduce any desirable constructional modifications without being deemed to depart from the scope of my invention.

Having now particularly ascertained and described the nature of my said invention as well as the manner in which the same is to be performed, I declare that what I claim is:

1. In a machine for weaving tubular fabric, shuttles for carrying and feeding the weft threads, each shuttle having a wedge shaped end, a circular series of pivotally mounted levers, each adapted to feed a warp thread, means for oscillating said levers so that some move in one direction while others move in the opposite direction and in such relation that a shed is opened and closed for each shuttle progressively along said series, said levers providing a track on which said shuttles may move and being adapted to press on said wedge shaped ends to propel the shuttles along said track through said sheds.

2. In a machine for weaving tubular fabric, a shuttle for carrying and feeding a weft thread, said shuttle having a wedge shaped end, an arcuately arranged group of pivotally mounted levers, each adapted to feed a warp thread, means for oscillating said levers so that some move in one direction while others move in the opposite direction in such relation that a shed is progressively opened and closed, said levers providing a track on which said shuttle may move and being adapted to press on said wedge shaped end when closing the shed to propel the shuttle along said track through said progressing open shed.

3. In a machine for weaving tubular fabric, a shuttle for carrying and feeding a weft-thread, each shuttle having a wedge shaped end, an arcuately arranged group of pairs of pivotally mounted levers, each lever being adapted to feed a warp thread, means for oscillating the levers of each pair past each other to close and open a shed and for so operating said pairs in a predetermined relation as to cause the open shed to progress along said group, said levers providing a track on which said shuttle may move and being adapted to press on said wedge shaped end to propel said shuttle along said track.

4. In a machine for weaving tubular fabric, shuttles for carrying and feeding the weft threads, each shuttle having a wedge shaped end, a circular series of pairs of pivotally mounted levers, each lever being adapted to feed a warp thread, mechanism associated with each pair of levers for causing oscillation of the two levers past each other, said levers being adapted to provide a track for said shuttles and said shuttles being adapted to be propelled along said track by the pressure on said wedge shaped ends of the levers of said pairs in moving toward each other, together with a rotary cam for operating said mechanisms in a predetermined order to effect the desired oscillation of said levers.

5. In a machine for weaving tubular fabric, shuttles for carrying and feeding the weft threads, each shuttle having a wedge shaped end, a circular series of pairs of pivotally mounted levers, each lever being adapted to feed a warp thread, said levers being adapted to provide a track for said shuttles, said shuttles being adapted to be propelled along said track by the pressure on said wedge shaped ends of the levers of said pairs in moving toward each other, and means for oscillating the levers of each pair simultaneously in opposite directions, and for operating said pairs in a predetermined order.

6. In a machine for weaving tubular fabric, shuttles for carrying and feeding the weft threads, a circular series of pairs of pivotally mounted levers, each lever being adapted to feed a warp thread, said levers being adapted to provide a track for said shuttles, each of said shuttles having a plate adapted to ride on said track and provided with pivotally mounted wedge-shaped ends, and means for oscillating the levers of each pair simultaneously in opposite directions to press on said ends and drive the shuttles, and for operating said pairs in a predetermined order.

7. In a machine for weaving tubular fabric, shuttles for carrying and feeding the weft threads, a circular series of pairs of pivotally mounted levers, each lever being adapted to feed a warp thread, said levers being adapted to provide a track for said shuttles, each of said shuttles having a plate adapted to ride on said track and provided with wedge-shaped ends pivoted thereon for swinging in two directions at right angles, and means for oscillating the levers of each pair simultaneously in opposite directions to press on said ends and drive the shuttles, and for operating said pairs in a predetermined order.

8. In a machine for weaving tubular fabric, shuttles for carrying and feeding the weft thread, each shuttle having a wedge shaped end, pairs of levers pivotally mounted and interconnected to oscillate past each other, each lever being adapted to feed a warp thread from its end remote from its pivotal axis, said levers having portions between their respective pivotal axes and thread delivery ends providing a track for said shuttles, said portions being shaped to engage said wedge shaped ends with pressure to move the shuttles along as the levers come together, and means for oscillating the levers of each pair simultaneously and for operating said pairs in a predetermined order.

9. In a machine for weaving tubular fabric, shuttles with wedge shaped ends for carrying and feeding the weft threads, a circular series of operating units, each unit comprising a support, two levers pivotally mounted thereon and mechanism for oscillating said levers past each other, each of said levers being adapted to feed a warp thread, said levers having portions co-acting to form a track for said shuttles and being shaped to engage said wedge shaped ends with pressure to move the shuttles along as the levers come together, together with cam means for operating the lever oscillating means of all of said pairs of levers in a predetermined order to propel said shuttles along said track while manipulating said warp threads to effect weaving.

10. In a machine for weaving tubular fabric, a main frame, shuttles with wedge shaped ends for carrying the weft threads, a circular series of independent operating units removably secured to said main frame, each unit comprising a support, two levers pivotally mounted thereon and mechanism for oscillating said levers past each other, each of said levers being adapted to feed a warp thread, said levers having portions co-acting to form a track for said shuttles, and being shaped to engage said wedge shaped ends with pressure to move the shuttles along as the levers come together, together with cam means for operating the lever oscillating means of all of said pairs of levers in a predetermined order to propel said shuttles along said track while manipulating said warp threads to effect weaving.

11. An operating unit for a tubular weaving machine, comprising a support adapted to be secured to the main frame of the machine, two levers pivotally mounted on said support, a rocker member pivotally mounted on said frame and having a portion adapted to engage a cam to be rocked thereby, and rods connecting said member on opposite sides of its pivotal axis respectively to said levers, whereby rocking of said member will cause said levers to oscillate past each other, each of said levers being adapted to feed a warp thread from its end remote from its pivotal axis, and said levers having portions intermediate their axes and their yarn feeding ends coacting to form a track for a shuttle.

12. An operating unit for a tubular weaving machine comprising a support adapted to be secured to the main frame of the machine, two levers pivotally mounted on the said support, means adapted to be operated by a cam for oscillating said levers past each other, said levers being adapted to serve as warp-thread guides and to provide between them a track for a weft-thread shuttle driven by said levers in their oscillations, means for leading threads to said levers and thread take-up members pivotally mounted on said support, said levers having cam shaped portions to move said take-up members to compensate for slack in the thread incident to oscillation of said levers.

13. A shuttle for use in a machine for weaving tubular fabric, comprising a shuttle plate having a wedge-shaped member pivotally mounted on the rear end thereof.

14. A shuttle for use in a machine for weaving tubular fabric comprising a shuttle plate having wedge-shaped members pivotally mounted on the ends of said plate in such manner as to swing in two directions at right angles.

15. A shuttle for use in a machine for weaving tubular fabric comprising a shuttle plate having wedge-shaped members freely mounted on the ends of said plate, the peaks of said members being off-set from the center line of the plate.

16. In a machine for weaving tubular fabric, shuttles for carrying and feeding the weft-threads, each shuttle having a wedge-shaped end, a circular series of pairs of pivotally mounted levers, each lever being adapted to feed a warp thread, said levers being adapted to provide a track for said shuttles, said shuttles being adapted to be propelled along said track by the pressure of said ends of the levers of said pairs in moving toward each other, means for oscillating the levers of each pair simultaneously in opposite directions and for operating said pairs in a predetermined order, means for feeding a warp thread to each of said levers and thread take-up means operated by said levers for compensating for slack incident to the oscillation of said levers.

In testimony whereof I affix my signature.

ALEXANDRE PONCET.